United States Patent [19]
Wilkinson et al.

[11] Patent Number: 6,025,011
[45] Date of Patent: *Feb. 15, 2000

[54] PROCESS FOR PRODUCING NIXTAMAL AND MASA FLOUR

[75] Inventors: Raleigh J. Wilkinson, Lockport; Jeffrey R. Short, III, Lincolnshire, both of Ill.

[73] Assignee: J. R. Short Milling Company, Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/871,672

[22] Filed: Jun. 9, 1997

[51] Int. Cl.⁷ ..................................... A21D 2/00
[52] U.S. Cl. .................. 426/622; 426/463; 426/507; 426/549; 426/626
[58] Field of Search ................... 426/626, 622, 426/455, 559, 463, 507, 549

[56] References Cited

U.S. PATENT DOCUMENTS

| | | | |
|---|---|---|---|
| Re. 26,263 | 9/1967 | Madrazo et al. | 426/626 |
| 2,704,257 | 3/1955 | Sollano et al. | 426/626 |
| 3,194,664 | 7/1965 | Eytinge | 99/80 |
| 3,369,908 | 2/1968 | Gonzalez et al. | 426/622 |
| 4,089,259 | 5/1978 | Stickle et al. | 99/355 |
| 4,108,847 | 8/1978 | Creinin et al. | 426/104 |
| 4,250,802 | 2/1981 | Rubio | 99/348 |
| 4,463,022 | 7/1984 | Sterner et al. | 426/262 |
| 4,513,018 | 4/1985 | Rubio | 426/622 |
| 4,594,260 | 6/1986 | Vaqueiro et al. | 426/622 |
| 4,623,550 | 11/1986 | Willard | 426/440 |
| 4,640,843 | 2/1987 | Matuszak et al. | 426/560 |
| 4,803,091 | 2/1989 | Mottur et al. | 426/439 |
| 4,876,101 | 10/1989 | Willard | 426/549 |
| 4,985,269 | 1/1991 | Irvin et al. | 426/560 |
| 5,176,931 | 1/1993 | Herbster | 426/242 |
| 5,298,274 | 3/1994 | Khalsa | 426/560 |
| 5,395,637 | 3/1995 | Reeg | 426/549 |
| 5,401,522 | 3/1995 | Reeg | 426/549 |
| 5,447,742 | 9/1995 | Malvido et al. | 426/626 |
| 5,532,013 | 7/1996 | Martinez-Bustos et al. | 426/496 |
| 5,558,898 | 9/1996 | Sunderland | 426/626 |
| 5,652,010 | 7/1997 | Gimmler et al. | 426/549 |

OTHER PUBLICATIONS

"Extruded Corn Flour as an Alternative to Lime–Heated Corn Flour for Tortilla Preparation", Bazua et al., Journal of Food Science, vol. 44 (1979), pp. 940–941.

"Drum Drying for the Improved Production of Instant Tortilla Flour", Molina et al., Journal of Food Science, vol. 42, No. 6 (1977), pp. 1432–1433.

*Primary Examiner*—Lien Tran
*Attorney, Agent, or Firm*—Roylance, Abrams, Berdo & Goodman, L.L.P.

[57] ABSTRACT

Whole kernel corn is ground and sifted to separate a coarse particle fraction which is then heated with lime and water to a temperature of at least 71° C. and below 100° C., preferably about 99° C. or less, for up to about 15 minutes. A fine particle fraction from the sifting step can be combined with the heat treated coarse fraction. The resulting heat treated mixture is then dried under a vacuum while continuously mixing for at least about 20 minutes to obtain a dried masa flour having a moisture content of about 7% to about 12% by weight. Thereafter, the dried masa flour can be ground while maintaining the temperature below the gelatinization temperature to reduce the particle size of the masa flour without further gelatinization.

36 Claims, 2 Drawing Sheets

PROCESS FOR PRODUCING NIXTAMAL AND MASA FLOUR

FIELD OF THE INVENTION

The present invention is directed to a process of producing nixtamal and masa flour and to the masa flour obtained thereby. More particularly, the invention is directed to a process of producing nixtamal and masa flour by heating a mixture of milled whole corn flour, water and an alkaline material.

BACKGROUND OF THE INVENTION

Nixtamal and masa flour are used primarily for producing tortillas, taco shells and chips. The popularity of food products made from nixtamal has increased significantly in recent years thereby increasing the demand for nixtamal and the need for improved production processes.

Nixtamal is typically made commercially by the traditional method of cooking whole corn in a mixture of water and lime. The corn is cooked at a temperature below the boiling point for a period of time depending on the hardness of the corn. The corn is then allowed to steep for eight hours or more to loosen and degrade the pericarp.

The cooking liquor is then drained and the corn washed several times to remove the lime and other solubilized materials. The corn is then treated to remove the bran and separate any remaining pericarp. Thereafter, the washed and debranned corn is passed through a grinder to mill the corn to the selected particle size. The ground masa can be mixed with sufficient water to form a dough for making tortillas or other products. The ground masa can also be dried to produce a masa flour.

Conventional masa flour processes experience several disadvantages. For example, the time required for steeping places production limits on equipment and increases the space requirements for the manufacturing facility. In addition, the process produces large amounts of waste water which must be treated prior to disposal. The treating liquor contains large amounts of dissolved pericarp and soluble starches which cannot be ecologically discharged into water ways or municipal waste water systems. Generally, the manufacturing facility must bear the cost of treating the waste water prior to discharge.

In recent years a number of processes have been developed for improving the efficiency of nixtamal and masa flour production. Many of these processes attempt to shorten the cooking or steeping time or vary the concentration of additives to increase production rates. One example is disclosed in U.S. Pat. No. 5,558,898 to Sunderland. This patent discloses a process for producing masa flour where the whole grain is partially cooked in a hot alkaline solution to partially gelatinize the starch and loosen the bran. Thereafter, the grain is debranned, flash dried and milled.

Further developments in the production of masa and masa flour use ground corn or corn flour as the starting material instead of whole corn. These processes typically treat the ground corn with water at elevated temperatures to hydrate the corn in less time than the conventional steeping. An example of such a process is generally disclosed in U.S. Pat. No. 5,532,013 to Martinez-Bustos et al. In this process whole corn flour is mixed with lime and water and heated to 60° to 95° C. in a cooker-extruder to partially cook the mixture. The partially cooked mixture is then discharged through a die to a cooling chamber and thereafter extruded through a nozzle.

Other processes of producing masa from ground corn are disclosed in U.S. Pat. Nos. 5,395,637 and 5,401,522 to Reeg. The disclosed processes form a mixture of corn flour, water and lime and heat the mixture slightly above the gelatinization temperature and then cooled below the gelatinization temperature to only partially gelatinize the starch. The upper limit of the heating temperature is selected to carefully control the gelatinization of the starch.

The above-noted processes for producing nixtamal and masa flour have not completely overcome the deficiencies of the traditional masa production process. Accordingly, there is a continuing need in the industry for an improved process of producing nixtamal and masa flour.

SUMMARY OF THE INVENTION

The present invention is directed to nixtamal and masa flour and to a process of producing the nixtamal and masa flour which is often referred to as nixtamalized flour. The disadvantages and limitations of the prior processes are overcome by the present invention by providing a more effective process for producing masa flour. Accordingly, a primary object of the invention is to provide an efficient process and nixtamal and masa flour produced by the process where the masa has improved handling and machinability properties compared to the products of the prior commercial processes.

Another object of the invention is to provide a process for producing nixtamal and masa flour in a manner to reduce the processing time compared to prior processes.

A further object of the invention is to provide a process of controlling the extent of gelatinization of starch in corn during the production of nixtamal and masa four.

A still further object of the invention is to provide a process for producing nixtamal having reduced stickiness and improved sheeting properties.

Another object of the invention is to provide a process for producing nixtamal and masa flour by heating a ground corn, lime or other alkali and water mixture above the gelatinization temperature for a time to gelatinize only a portion of the starch in the corn.

A further object of the invention is to provide an economical continuous process for producing masa and masa flour.

Still another object of the invention is to provide a process for processing nixtamal and masa flour by heating a mixture of ground corn, lime and water under pressure.

The objects of the invention are basically attained by providing a process for producing a masa corn flour comprising the steps of combining ground whole kernel corn, lime and water and forming an admixture having about 30% to about 65% by weight water based on the total weight of the admixture, heating the admixture to a temperature of about 71° C. to about 99° C. for sufficient time to partially gelatinize the starch in the corn and to form a heat treated mixture, and applying a vacuum to the heat treated admixture to cool and dry the admixture and to produce a dried masa corn flour having a moisture content of about 7% to about 13% by weight.

The objects and advantages of the invention are further attained by a process for producing masa comprising the steps of heating whole corn to a temperature of about 82° C. to about 93° C. for sufficient time to deactivate enzymes in the corn, grinding the corn to produce ground corn, admixing the ground corn with alkali and water to form an admixture, heating the admixture to a temperature of about 71° C. to about 82° C. for sufficient time to produce a heat treated masa corn mixture, and cooling the mixture.

The objects of the invention are also obtained by a process for producing a masa corn flour, comprising the steps of feeding a coarse ground corn having an average particle size of about 0.60 mm to about 0.180 mm to a mixing device, admixing the ground corn with lime and water to form an admixture and heating the admixture to a temperature of about 93° C. to about 99° C. for about 15 minutes or less, to form a hot heat treated admixture, admixing a fine ground corn to the hot heat treated admixture, wherein the fine ground corn has an average particle size of about 0.180 mm to about 0.125 mm, and cooling and drying the admixture.

The objects of the invention and other salient features of the invention will become apparent from the following detailed description of the invention which forms an original part of this original disclosure.

BRIEF DESCRIPTION OF THE DRAWINGS

Referring to the drawings which form part of this original disclosure.

DETAILED DESCRIPTION OF THE INVENTION

The present invention is directed to a nixtamal and masa flour product and to a process for producing the nixtamal and masa flour. The process of producing masa and masa flour by treating corn with alkali is referred to as nixtamalization. The resulting nixtamalized flour is referred to herein as masa flour.

The process of the invention can be a batch process or continuous process depending on the equipment used and the desired rate of production of the products. The processes of the invention basically involves forming a mixture of ground whole or degermed grain, alkali and water and heating the mixture for sufficient time to partially gelatinize the starch and to form a heat treated mixture. The heating is discontinued and the heat treated mixture is immediately cooled to stop the cooking process. The heat treated mixture is cooled and dried under vacuum to form a substantially finished product, such as masa flour. In embodiments of the invention, carbon dioxide can be introduced to the heat treated mixture from a supply tank and mixed with the mixture during or immediately before the vacuum drying to assist in cooling and drying of the mixture. The particle size of the dried product and particularly masa flour can be reduced further as desired.

In preferred embodiments of the invention the starting material is whole kernel, or degermed white, yellow, or blue corn, milled degermed corn meal, corn flour or mixtures thereof. In further embodiments, the grain can be a mixture of corn with other grains such as for example, wheat, rice or sorghum.

Figure 1:
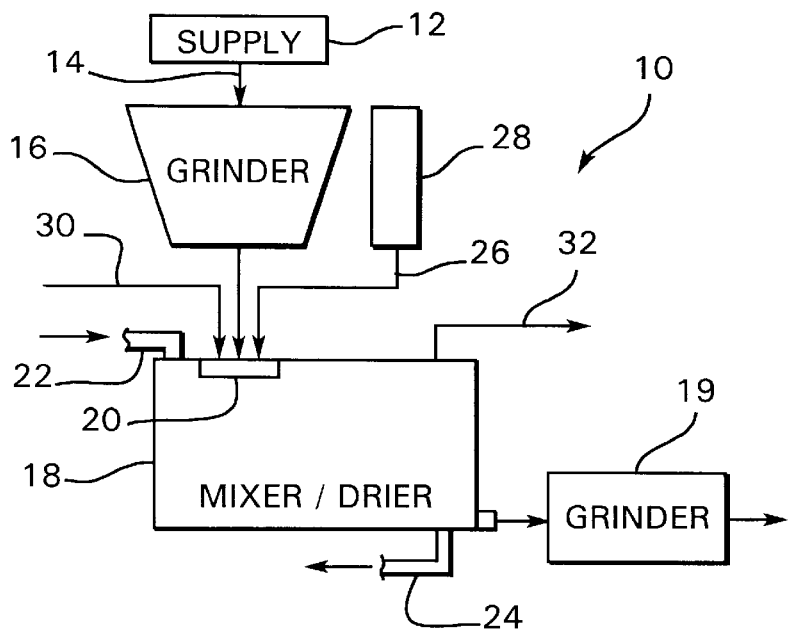
FIG. 1 is a schematic diagram of an apparatus for producing masa flour in a first embodiment of the invention.

Referring to FIG. 1, an apparatus 10 is schematically illustrated for carrying out the process in a first preferred embodiment of the invention. The process of this embodiment is a batch process which feeds corn from a supply 12 through a line 14 to a grinder 16 where the corn is ground to the desired particle size. The corn is generally ground to a particle size of about 1.0 mm or less preferably about 0.60 mm or less, although the actual particle size is dependent in part on the end use of the product and the processing conditions. In a preferred form of the invention, the corn in supply 12 is previously steeped and debranned corn. The grinder 16 can be any suitable grinding apparatus as known in the art capable of grinding corn to the desired particle size.

It has been found that the particle size of the ground flour is important in determining the properties of the final masa product. For example, it has been found that a fine granulation produces better tortillas where a coarse granulation produces better corn chips. In addition, the finer granulation hydrates faster than the coarse granulation thereby reducing the processing time in the heating device.

The ground corn is transferred to a continuous mixing device 18 where the corn is mixed with alkali and water to form a mixture. Mixing device 18 is preferably provided with a suitable closure 20 to seal mixing device 18 during mixing and heating. Mixing device 18 can be heated by introducing a heated fluid such a hot water, hot oil or steam through an external jacket surrounding the side and the end walls of the mixing chamber of the mixing device 18. The heated fluid is introduced to an inlet 22 and exits through an outlet 24 where it is returned to a suitable heating device (not shown). Heated fluid can also be introduced through a hollow mixing shaft, rotating hollow discs or circular wedges within the mixing device. In further embodiments, steam is injected into the mixing chamber of mixing device 18 and into the corn mixture to heat the corn directly. The steam pressure is preferably injected into the mixture at a steam pressure of about 15 to about 30 psi and preferably about 15 to about 20 psi. The pressure in the mixer is preferably at atmospheric pressure. Injecting steam directly into the mixer accelerates the cooking process and shortens the cooking time.

Lime is added to mixing device 18 through inlet 26 from a supply 28 while water is introduced through inlet 30. A vacuum is applied to mixing device 18 at a vacuum outlet 32. Vacuum outlet 32 preferably has a filter such as a cloth filter to prevent solid material from clogging the outlet. In embodiments of the invention, mixing device 18 can be connected in series to a mill to reduce the size of the processed material and to an apparatus for packaging the final product. The heat treated masa flour mixture is typically transferred to a second suitable grinder to reduce the particle size of the masa flour to a desired particle size substantiality without further gelatinization of the starch in the masa flour. The second grinder preferably grinds the masa flour by a cool grinding step without heating the flour.

The mixing device 18 of the embodiment of FIG. 1 is preferably a horizontal cylindrical vessel having an inlet for the feed materials and a closure or other suitable sealing arrangement for selectively pressurizing and/or evacuating the vessel as desired at various stages of the processing. The mixing device 18 preferably includes a rotating horizontal shaft having a plurality of plow-shaped agitators. The shaft is mounted in bearings at the end walls for rotation and coupling to a suitable motor. The rotating shaft can further carry mixing or chopping arms. For example, the vessel can include a plurality of separately actuated choppers located in the bottom portion of the mixing device. The choppers provide additional mixing and chopping to break up any large lumps which may form and to promote uniform mixing and heating of the mixture. A bottom port is typically provided to allow easy discharge of the heat treated corn mixture.

The mixing device 18 also includes an injection port to inject steam directly into the mixture. A plurality of outlets are generally provided along the length of the bottom of mixing device 18 to inject the steam or other fluids at selected points along the length of the mixing device. Alternatively, the mixing device can be a screw conveyer with a hollow screw or steam heated jacket. Examples of suitable mixing devices are available from the Littleford-Day Company of Florence, Ky., and from the Processall Company of Cincinnati, Ohio. Other suitable mixing devices having hollow discs or circular wedges for receiving heated fluids are available from Bepex Corp of Minneapolis, Minn. and Komline-Sanderson Engineering Corp of Peapack, N.J.

In a preferred embodiment, the mixing device 18 is a Littleford Model DVT-30 made by Littleford-Day Company of Florence, Ky. This mixing device has an outer jacket for circulating heating fluid such as hot water, steam, or hot oil. The mixing device also includes injection ports for injecting steam and/or water directly into the mixing chamber and into contact with the material being processed. The mixing device includes a plow type blender and chopping blades which rotate at high speed compared to the rotational speed of the plow type blades.

The vacuum system of the mixing device is generally coupled to a condenser which is water cooled for condensing and recovering water vapor drawn from the mixture. The collected water can be discarded or recycled for other uses. During the cooling and drying of the heat treated mixture, cool water or other fluid can be passed through the jacket of the mixing device as needed. The jacket of the mixing device can be heated by steam or hot water as needed during the cooling and drying stage to increase the efficiency of the vacuum drying so long as the temperature of the mixture is below the gelatinization temperature of the starch.

Figure 2:
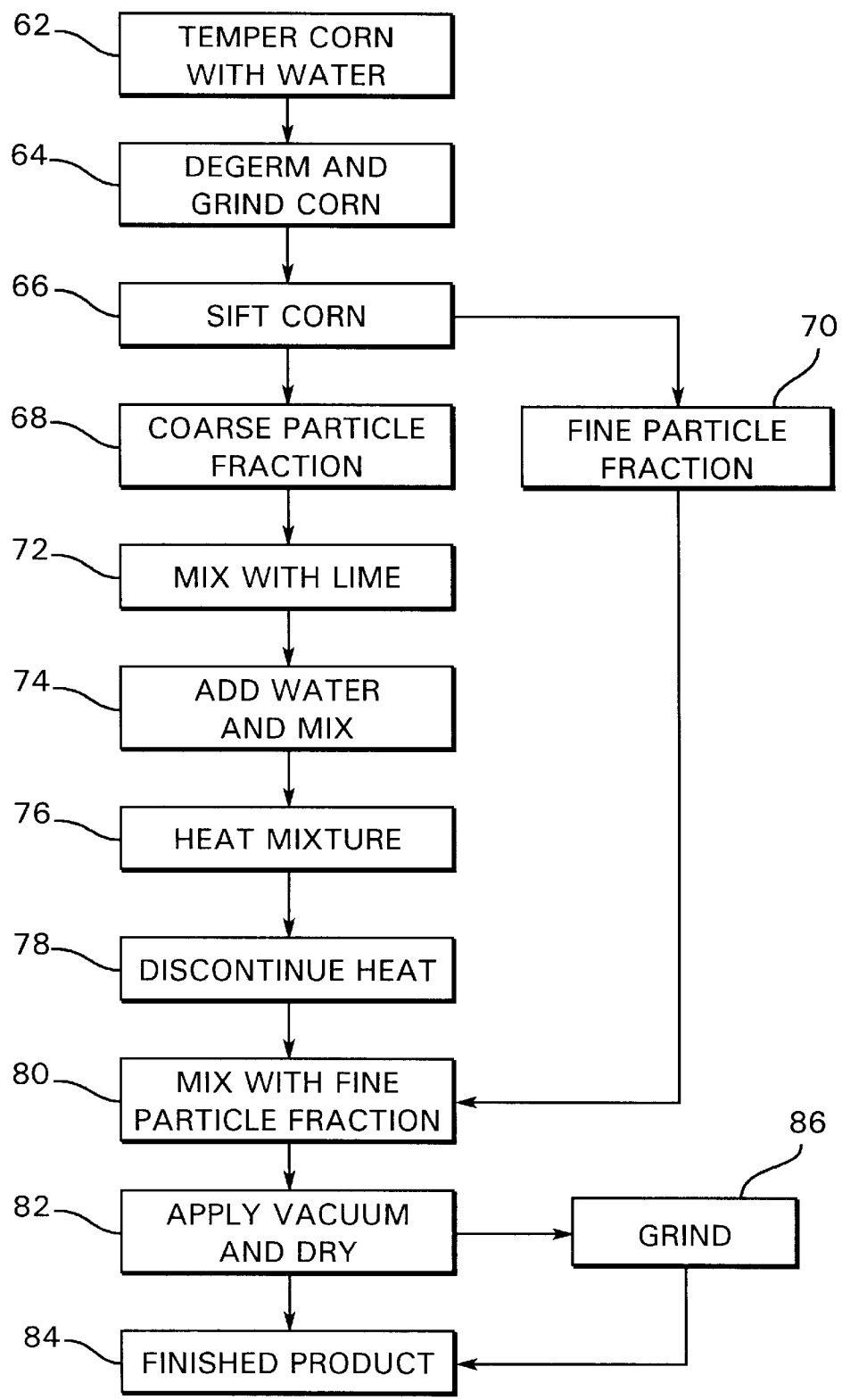
FIG. 2 is a flow chart depicting the process steps in producing masa flour in a preferred embodiment of the invention.

FIG. 2 schematically illustrates a preferred process of the invention. The corn or other grain is selected for processing and transferred to a tempering vessel as indicated by block 62. The corn is preferably whole kernel corn and can be white corn, yellow corn, blue corn and mixtures thereof. The whole kernel corn is tempered by mixing with a sufficient amount of water to moisten the corn and allowing the corn to stand for a period of time to soften the outer surface. Typically, the corn is allowed to stand for about 15 minutes. The corn is then passed through a degerminator, such as a Beall degerminator, to separate the germ and pericarp from the endosperm and grind the corn as indicated by block 64. The corn is then aspirated after the degerminator to remove about 1% by weight of the corn bran using standard equipment.

After the corn bran is removed, the resulting ground corn flour is sifted or screened as indicated in block 66 to separate the corn into an oversize coarse particle fraction in block 68 and an undersize fine particle fraction in block 70. The coarse particle fraction is a mixture of particle sizes but typically comprises about 80–90% by weight of particles of 80 U.S. mesh (0.180 mm) or larger with a majority of the particles being between about 30 U.S. mesh (0.60 mm) and 80 U.S. mesh. The coarse fraction is preferably 15% by weight maximum on U.S. 30 mesh and, 14% by weight maximum on U.S. 80 mesh. As these terms are used herein, the corn is screened so that not more than 15% by weight of the particles are greater than 30 U.S. mesh and not more than 14% by weight are less than 80 U.S. mesh. The fine particle size fraction typically comprises about 70% to 80% by weight particles of about 100 U.S. mesh or smaller. The predominant portion of the fine particle fraction comprises particles of 120 U.S. mesh by weight(0.125 mm) or smaller. The fine particle fraction is preferably a maximum of 25% by weight on U.S. 80 mesh (25% max.) through 120 U.S. mesh, with not less than 45% by weight being less than 120 mesh (45% min.).

The grinding of the corn preferably produces about one third fine fraction and about two thirds coarse fraction. The grinding typically produces at least 33% by weight fine fraction, and generally about 50% to about 75% by weight fine fraction with the remainder the coarse fraction. The coarse fraction of the ground corn is preferably at least 66% by weight based on the total weight of the ground corn.

In this embodiment the coarse particle fraction is introduced into a mixer and mixed with up to about 0.33% by weight lime (calcium oxide) based on the weight of the coarse corn fraction as indicated by block 72. The addition of 0.33% by weight lime with the coarse fraction produces a pH of about 6.7 to 7.6 in the coarse fraction. In preferred embodiments, the lime is added as a dry powder to form a dry mixture. Water is then injected into the mixer and mixed with the ground corn and lime mixture as indicated by block 74. Preferably water is added in the amount of about 30% to about 60% by weight based on the weight of the coarse corn fraction. The mixer is operated for a sufficient period of time to completely mix the corn fraction with the water and lime.

The mixture is then heated to at least 71° C., generally about 82° C. to about 99° C., preferably about 93.3° C. to about 99° C. and most preferably about 96° C. as indicated by block 76. In preferred embodiments steam is injected directly into the mixer at a steam pressure of about 15–30 psi and preferably about 15–20 psi to heat the corn flour while continuously mixing. Typically, steam is injected into the ground corn until resulting corn mixtures reaches a predetermined temperature, and then the steam injection is discontinued. In a preferred embodiment, steam is injected until the corn mixture reaches 96° C. and the steam is discontinued. Heat can be discontinued entirely or heat can be applied to the jacket of the mixer to hold the mixture at the predetermined temperature for up to about 10 minutes while mixing continuously.

The mixer is continuously operated at about 55 to 160 rpm, preferably at about 100 rpm, and heat is applied for sufficient time to produce a heat treated corn mixture. Typically, the mixture is heated for about 15 minutes or less, preferably about 5 minutes to 10 minutes. The actual heating time is dependent on the material being heated, the moisture content, the desired extent of starch gelatinization and the average particle size. For example, white and yellow corn process differently and require different heating times. Ground white corn, for example, processes slower than yellow corn at the same temperature. White corn is generally heated to about 96° C. for 10 minutes or less. The temperature and mixing time are preferably selected to obtain a heat treated mixture having about 30% to about 40% of the available starch gelatinized.

At the end of the heating phase in this embodiment, the steam injection is discontinued while continuing operation of the mixing device as indicated in block 78. The fine corn fraction which was initially separated in block 66 is then combined with the heat treated coarse fraction as indicated in block 80 and mixed continuously to obtain a uniform mixture of whole corn. The residual heat and moisture in the mixture combined with the continuous mixing is often sufficient to hydrate and partially gelatinize the fine fraction of the ground corn although heat can be applied to the mixer as needed. An additional amount of dry powdered lime can be added with the fine fraction to increase the total lime content of the finished product. The addition of lime with the fine fraction is optional and depends primarily on the desired lime content of the final product. When lime is added with the fine fraction, the lime is combined in the amount of up to about 0.33% by weight based on the total weight of the fine fraction.

The mixing device is coupled to a vacuum source to produce a negative pressure of about 21 to 31 inches of mercury as indicated in block 82 and the mixer is continuously operated for about 20 to about 45 minutes to dry and cool the mixture simultaneously and produce the final product as indicated in block 84. The actual drying time will vary depending on the moisture content of the mixture, the amount of fine particle fraction added in relation to the amounts of the coarse corn fraction, the vacuum that is applied and the starting temperature of the heat treated coarse fraction. A lower pressure will typically reduce the drying time. In preferred embodiments, the vacuum is applied after the fine fraction is added and mixed with the heat treated coarse fraction.

The heat treated corn mixture is dried under vacuum to a moisture content of about 7% to about 13.5% by weight and preferably about 10% to 11% by weight based on the total weight of the mixture. The moisture content of the mixture can be approximated by measuring the internal temperature of the mixer and the temperature of the corn mixture for a given mass, the starting temperature, and the vacuum. The pH of the final dried masa flour is about pH 6.7 to about pH 8.9.

The drying step is preferably carried out at a temperature below the gelatinization temperature of the starch in the corn. It is particularly desirable to dry the heat treated mixture under conditions to avoid any further starch gelatinization during the vacuum drying. Applying a vacuum to the heat treated corn mixture increases the rate of drying without increasing the temperature. As the water in the heat treated mixture is drawn off, the vaporization provides a cooling effect to reduce the temperature quickly below the gelatinization temperature. For large scale production processes it is often necessary to apply heat to the jacket during the vacuum drying to maintain the temperature at a sufficiently high temperature so that the rate of evaporation continues at an efficient rate. The heat applied to the mixing device during the vacuum drying preferable maintains the temperature of the mixture below the gelatinization temperature of the starch in the corn.

In preferred embodiments, the dried heat treated masa flour is ground in a secondary grinding step as indicated by block 86 to reduce the particle size and obtain a material with a narrow particle size distribution. It is important that the secondary grinding step reduce the particle size of the masa under conditions to maintain the temperature of the masa below the gelatinization temperature of the corn, and preferably below about 70° C. Grinding the heat treated masa below the gelatinization temperature prevents the masa from being over gelatinized and provides a process for controlling the extent of gelatinization in the final product.

A preferred secondary grinding step is carried out in an air classifier grinder to reduce the granulation size of the masa without heating the masa above the gelatinization temperature and without further gelatinizing the starch in the masa flour. A typical air classifier grinder introduces a large amount of air into the grinder and the material being processed with the finely ground particles being carried with the air flowing through the grinder. The coarser particles are recirculated within the grinder by the flow of air to further grind the coarse particles. The granulation is generally controlled by varying the speed of the air flow and by controlling the speed of the rotating classifier vanes. Increasing the speed of the classifier vanes and the speed of the air flow results in a finer granulation of the material. The resulting mixture of air and the ground material exits the air classifier grinder to a suitable dust collector where the ground material is Ad separated and recovered. Suitable air classifier grinders are commercially available from Sturtevant, Inc. of Boston, Mass. Hosokawa Micron Powder Systems of Summit N.J. and Blue Tech, Inc. of Hickory, N.C.

In further embodiments the secondary grinding step is carried out using a cryogenic grinder. Typically, cryogenic grinders inject cryogenic nitrogen gas into the material to cool or freeze the material immediately prior to grinding. Alternatively, the cryogenic gas can be introduced directly into the grinder during grinding. The introduction of the cryogenic gas freezes the material being ground to maintain the temperature well below the gelatinization temperature of the corn. The cryogenic grinding is particularly desirable for corn having a high fat or oil content which can be difficult to grind without producing a gummy or sticky mixture and without oil separation.

It has been found that the different particle sizes of ground corn hydrate at different rates resulting in different stages of starch gelatinization and hydration for a given temperature and heating time. The fine particle fraction hydrates quickly compared to the coarse fraction which can result in uneven hydration and gelatinization when a mixture of fine and coarse fraction is processed simultaneously. Accordingly, in this embodiment of the invention, the coarse particle fraction is heated with the lime and water to produce a heat treated mixture of the coarse fraction. The coarse particle fraction has a comparatively narrow range of particle sizes so that the particles of the resulting heat treated mixture have a more uniform degree of hydration and starch gelatinization compared to a mixture of particle sizes. The fine particle fraction is generally mixed with the heat treated coarse fraction.

The grinding of the whole kernel corn can be selected to grind the corn to the desired particle size according to the end use of the resulting masa flour. The texture and characteristics of the masa flour can also be modified by adjusting the ratio of the coarse particle size fraction and the fine particle size fraction.

The residual moisture and heat in the heat treated coarse particle fraction in this embodiment is sufficient to hydrate and gelatinize the fine particle fraction when the fine fraction is mixed with the coarse fraction immediately after the heating step and before the cooling step since the fine particles hydrate and react quickly. The vacuum drying typically produces a dried masa flour mixture having a substantially uniform moisture content and degree of starch gelatinization. In preferred embodiments, about 30% to about 40% of the starch in the final product is gelatinized.

The whole kernel corn for use in the present invention is generally unprocessed corn that is initially cleaned to remove foreign materials and impurities. The starting feed material can be ground whole corn or a mixture of ground whole corn and degerminated corn grits, degerminated corn meal, degerminated corn flour or corn germ. Preferably, the feed mixture has a fat content of 3.0–4.5%, a crude fiber content of 0.65–0.85%, a starch content of 70–78%, a protein content of 7–9% with the remainder moisture.

Preferably, the moisture content is about 14.5% or less based on the total weight of the ground corn or mixture.

The alkali is preferably a commercial grade which comprises calcium oxide, calcium hydroxide and various naturally occurring impurities. The lime is preferably added as a powdered solid which is mixed with the ground corn prior to the addition of water to the feed mixture. An aqueous solution of lime can be used in further embodiments to control the concentration and pH of the resulting mixture. A lime solution can be metered into the mixing device at a controlled rate at the desired ratio of the feed rate of the raw feed material. Although lime is generally preferred, other alkaline compounds can be used alone or in combination with the lime, including, for example, sodium or potassium hydroxide.

In embodiments of the invention, the lime or other alkali is generally added to the ground corn in the amount of about 0.05% to about 2.0% and more preferably about 0.1% to about 0.3% by weight and most preferably about 0.1% to about 0.2% by weight based on the weight of the corn feed mixture. Typically, the lime is added in an amount to produce a finished masa flour having a pH of about 6.7 to about 8.9. It has been found that amounts of lime less than about 0.2% by weight do not consistently produce a final product having the desirable lime taste and texture typically associated with tortillas. Lime added in amounts greater than 0.2% by weight can produce the desirable lime taste, but can result in an undesirable gray or off-color. In embodiments of the invention, the amount of lime is preferably added to optimize the taste and texture without adversely affecting the color of the resulting product. In further embodiments, lime can be added in amounts greater than 0.2% and up to about 1.0% to 2.0% to produce a desirable product.

In embodiments of the invention, it is desirable to add about 0.5% to 2.0% and preferably about 1.0% by weight lime based on the weight of the coarse fraction to form a lime concentrate coarse fraction. The coarse fraction is mixed with the fine fraction to produce a masa flour having a pH of about 9.5 to about 10.95. This product can be used without further processing or blended with other masa flour.

The amount of lime added to the ground corn will vary depending on the supplier and the amount of available calcium oxide in the lime. For example, lime is available from Marblehead Lime Company of Chicago, Ill. which has about 68.76% by weight calcium oxide available. A purified food grade lime from Mallinickrodt Chemical Company of St. Louis, Mo., comprises 96% by weight available calcium oxide.

Water is preferably admixed with the starting feed material in the mixer. The amount of water added to ground whole corn is about 30% to about 60% by weight based on the total weight of the corn in the final product when a dried masa flour is to be produced. Corn flour typically has about 12% by weight moisture so that the final mixture of corn flour, lime and water preferably has a total water content of about 30% to 65% by weight based on the total weight of the mixture. The actual amount of water added will depend on the type of corn being processed and moisture content of the raw corn. White corn generally requires up to about 4% less added water than yellow corn. When the masa is to be used directly without a drying step, the water content can be increased before or after the heating step to produce a dough of the desired texture and consistency for sheeting, cutting and baking or frying. The water content is preferably maintained at about 60% to 65% or less based on the weight of the corn when a dry flour is produced to minimize the amount of water which must be removed during drying and to maximize the efficiency of fit the drier.

The ground corn or other raw feed mixture, lime and water are introduced to mixing device and continuously mixed while heating to a temperature of about 71° C. (160° F.) to about 99° C. (211° F.). It is particularly desirable to maintain the heating temperature below 100° C. to prevent over gelatinization of the starch in the corn. Heating the mixture above the boiling point produces a highly gelatinized, heat treated mixture that is very sticky and gummy and does not process properly. In preferred embodiments, the corn, lime and water mixture is heated from a temperature of about 82° C. (175° F.) to about 99° C. (211° F.) and most preferably to a maximum temperature about 96° C. (205° F.) or less. The pressure is generally maintained at about atmospheric pressure while heating to prevent over gelatinization. Heating the mixture to about 96° C. is found to form a product having excellent working and sheeting properties for making table tortillas using commercially available sheeting equipment. Heating the corn mixture to a temperature of about 85° C. to about 87° C. is found to produce a product, which when fried or baked produces a desirable tortilla chip.

The corn, lime and water mixture is preferably heated for sufficient time at sufficiently high temperature to deactivate the enzymes in the corn, such as the lipoxygenase enzyme. Deactivating the enzymes is found to inhibit rancidity and to prolong the self life of the masa flour and products produced from the masa flour.

Once the temperature of the mixture reaches about 96° C., the steam to the mixing device can be discontinued and the speed of the mixing device reduced to about 80 rpm. The resulting heat treated mixture is subjected to a vacuum to cool the mixture rapidly to at least about 60° C. (140° F.) and generally about 32° C. (90° F.) to about 49° C. (120° F.). In alternative embodiments, steam or other heated fluids can be introduced into the jacket of the mixer to hold the temperature of the mixer during the vacuum drying at about 51° C. The amount of heat added to the mixer during the vacuum drying is dependent on the mass and temperature of the heat treated mixture and the structure of the mixing device. Typically, during the vacuum drying steps, a moisture content of about 10% by weight is obtained when the temperature of the mixture reaches about 52° C. to about 57° C. The heat treated mixture is then ground to the desired particle size and packaged using standard grinding and packaging equipment. Preferably, the heat treated mixture is ground under conditions to maintain the temperature below the gelatinization temperature of the corn to prevent further gelatinization.

The resulting heat treated mixture can be admixed with other additives including, for example, pH adjusting agents and processing agents to improve handling properties. Examples of suitable pH adjusting agents include lime and food grade acids, such as acetic acid, ascorbic acid, propionic acid and fumaric acid. The pH of the masa product is typically about 6.70 to 8.9 after processing. A food grade acid can be added after processing to adjust the pH to as low as about 4.9. The pH adjusting agents or other additives can be added before, during or after heat treating and vacuum drying and cooling of the mixture. Suitable processing agents include cellulose gums to increase water adsorption. Additional amounts of lime can be added to improve the lime flavor and aroma of the masa. Various preservatives can also be added to the masa including, for example, monocalcium phosphate, potassium sorbate, sodium or calcium propionate and mixtures thereof.

The flavor of the resulting masa can also be enhanced by the addition of corn germ, stabilized corn germ produced by heating to inactive the enzymes, toasted corn germ and mixtures thereof. The crude fiber content can be increased by the addition of corn bran. Vitamins and mineral supplements can also be added to enrich the masa flour product. Various flavorants such as chili peppers or other spices can be added to obtain the desired flavor. The amounts of these additives are determined by standard protocols depending on the desired result.

In a second embodiment of the invention, the ground corn, lime and water mixture is heated under continuous mixing in a pressurized mixing device at a pressure of about 15–20 psi. Heating the mixture under pressure is found to accelerate the processing time thereby reducing the heating and treating time with the lime. It is generally desirable to reduce the heating time when heating under pressure to prevent over gelatinization of the starch in the corn. Heating under pressure also reduces the loss of volatile flavor compounds of the corn. In embodiments of the invention, excess lime can be added during the processing to enhance the flavor and texture. Vacuum drying is carried out as in the previous embodiment.

In a third embodiment of the invention, prior to grinding, the whole kernel corn is heated to a temperature of about 82° C. (180° F.) to about 93° C. (200° F.) for sufficient time to deactivate the enzymes. Typically, heating for about 10 to 15 minutes is sufficient. Thereafter, the corn is ground and processed in the mixing device as in the previous embodiment. However, since the corn has been previously heat treated, it is desirable to heat the ground corn, lime and water mixture at a comparatively lower temperature of about 71° C. (160° F.) to about 82° C. (180° F.). Vacuum drying is carried out as in the previous embodiments.

In a fourth embodiment of the invention masa flour is produced by forming a first heat treated mixture as in the previous embodiments having very high lime concentration and combining the first mixture with a second heat treated mixture having little or no lime added during processing. The first and second mixtures can be blended in proportions to have an enhanced lime flavor compared to conventional masa processes.

In the previous embodiments, lime is generally admixed with the ground corn in amounts up to about 0.2% by weight and heated to produce the masa flour. Often, however, this level of lime does not produce the desirable lime taste and aroma required for table tortillas and other products made from masa flour. Adding lime with the ground corn during the processing in amounts greater than about 0.2% by weight can produce an undesirable off color with a gray cast in the final product. When the lime is added after the processing of the masa, an astringent, strong chemical taste develops in the masa flour instead of the taste commonly associated with tortillas.

In this embodiment of the invention, whole ground corn or a coarse particle fraction of the ground corn is admixed with about 0.3% to about 2.0%, preferably about 0.7% to about 1.3% and most preferably at least about 1.0% by weight lime based on the weight of the corn or coarse fraction. Lime added to the whole ground corn or coarse fraction in the amount of about 0.33% by weight results in a first heat treated mixture having a pH of about 6.70 to 7.6 while the addition of about 1.0% by weight lime to the whole ground corn or coarse fraction produces a first heat treated mixture of about pH 9.5 to 10.95. The amount of lime added will depend on the source of supply and the calcium oxide concentration. For example, it is found that about 1.25% by weight of lime having 68.76% calcium oxide and about 0.7% by weight lime having 96% calcium oxide produces a desirable product. The mixture is processed as in the previous embodiments by mixing with about 30–60% by weight water and heating the mixture to about 82° C. to 99° C. The resulting heat treated mixture has a gray, off color and a strong and distinct lime taste and aroma. The heat treated coarse fraction is then combined with the previously separated fine fraction and dried under vacuum as in the previous embodiment. The whole corn concentrate can be admixed with a masa flour obtained by processing with up to about 0.2% by weight lime or without added lime which does not have the off color or a strong distinctive lime taste. The concentrate masa flour is blended with the masa flour having 0.2% or less lime in the amount of about 7% to 12% and preferably about 10% by weight. The resulting masa flour blend has a desirable distinctive lime taste and aroma without the gray, off-color or the strong astringent chemical taste.

Figure 3:
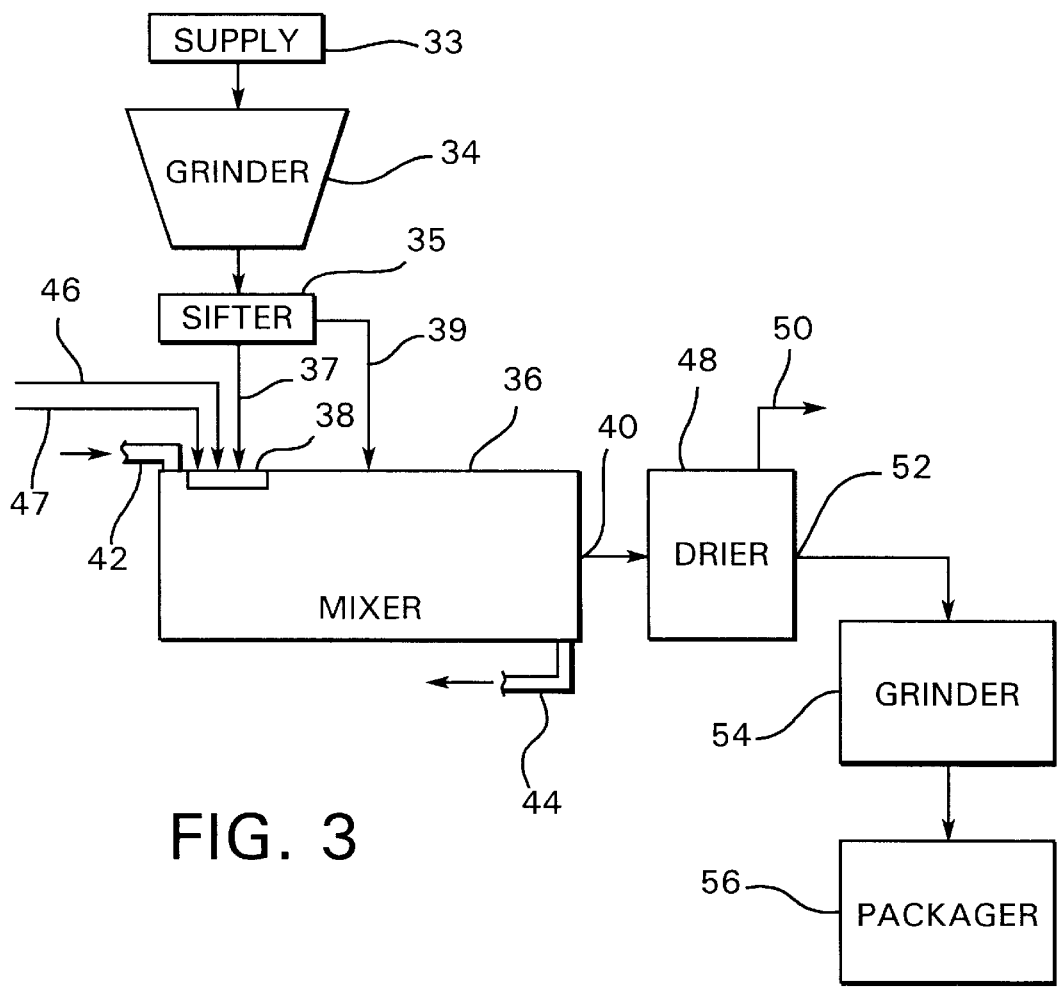
FIG. 3 is a schematic diagram of an alternative embodiment of the invention showing an apparatus for producing masa flour.

Referring to FIG. 3, an apparatus is illustrated schematically for the continuous production of masa and masa flour in a fifth embodiment of the invention. Whole kernel corn is fed from a supply 33 through a feed chute or conduit to a grinder 34 where the corn is ground to the desired particle size. The ground corn passes to a sifter 35 to separate a coarse corn fraction and a fine corn fraction. The coarse ground corn is then fed continuously through line 37 to a continuous mixer 36. Mixer 36 includes an inlet 38 for receiving the coarse ground corn and an outlet 40 for discharging the corn. The fine corn fraction passes through line 39 to about the midpoint of mixer 36 so that the fine fraction is mixed with the heat treated mixture in mixer 36. In further embodiments, the fine fraction can be added to the heat treated coarse fraction at any desired point along the mixer or drier.

Mixer 36 can be any suitable continuous mixing device as known in the art capable of heating and mixing the contents under pressure. Typical mixers include a rotating horizontal shaft extending longitudinally through the mixer which support a plurality of rotating paddles or screws. The rotating shaft continuously mixes the contents and conveys the contents from the inlet to the outlet at a controlled speed thereby controlling the residence time in the mixer. The pitch of the paddles and screw elements are selected to control the throughput rate of the mixer and back pressure in the mixer. Mixer 36 preferably includes a jacket for circulating heated fluid such as steam, hot water or hot oil. The heating fluid is fed to an inlet 42 and exits through a fluid outlet 44.

Water and lime or other alkali are fed through feed lines 46 and 47, respectively, to inlet 38 for mixing with the ground corn. Preferably, the lime is introduced as a solid and mixed with the ground corn before the addition of water. The lime is preferably added in the amount of up to about 0.2% by weight based on the weight of the flour. The water is typically added in the amount of about 30% to about 60% based on the weight of the flour.

The water, lime and corn flour are intimately mixed while being heated in the mixer 36 and conveyed at a rate to provide a residence time of up to about 15 minutes, preferably about 5 to 10 minutes. During the heating process, the mixture is heated to about 82° C. to about 99° C. and preferably about 96° C. Thereafter, the heat treated mixture is transferred to a vacuum drier 48. A vacuum source is coupled to drier at 50. Drier 48 is preferably operated at about 20 to 31 inches of mercury to cool the heat treated mixture and remove excess moisture without further gelatinization of the starch. The moisture content of the mixture is preferably reduced to about 9–13% by weight and more preferably about 10–11% by weight based on the weight of the corn flour. Drier 48 is preferably a continuous drying apparatus as known in the art capable of discharging dried material at a controlled moisture level and production rate. Drier 48 preferably maintains the heat treated mixture below the gelatinization temperature. Drier 48 can have rotating blades, paddles or screws to lift and toss the heat treated mixture and convey the mixture toward the discharge outlet of the drier.

The dried masa flour is discharged from drier 48 through an outlet 52 and transferred to a mill or grinder 54 to reduce the masa flour to the desired particle size. The dried masa exiting drier 48 can have a large percentage of dried lumps that can be crushed or ground for proper mixing with water and other ingredients in the manufacture of the final products. The particle size of the dried masa flour exiting drier 48 can depend on the construction and operation of the drier, the final moisture content and the particle size of the starting materials. The mill 54 can be eliminated when the particle size of the dried mixture exiting mixer 48 is of acceptable size for the intended use of the masa flour. The resulting masa flour can be further processed as desired such as, for example grinding under cool temperatures to prevent further gelatinization or transferred to a suitable packaging apparatus 56.

Additional ingredients can be added to the dried masa flour either directly in the mixer or by transferring to a second mixing device. Examples of suitable additives can include additional lime to enhance the flavor, vegetable gums, fumaric acid, ascorbic acid, citric acid, mono and/or diglycerides, preservatives, toasted corn germ, corn germ which has been treated to inactivate the enzymes, and processing enhancers.

The following non-limiting examples disclose preferred embodiments of the invention.

EXAMPLE 1

A whole kernel yellow corn is tempered by covering the corn with water and allowing to stand for at least about 15 minutes. The tempered corn is passed through a Beall degerminator to separate the germ and pericarp from the endosperm and then aspirated to remove about 1% of the corn bran. The resulting corn product is then sifted to recover a fine particle size fraction and a coarse particle size fraction. The fat, moisture and particle size distribution of the fine and coarse fractions typically obtained are shown in Table 1 below.

TABLE 1

| Granulation (U.S. Mesh): | 30 | 40 | 80 | 100 | 120 | T120 | Fat % | Moisture % |
|---|---|---|---|---|---|---|---|---|
| Yellow ground corn: | | | | | | | | |
| Coarse fraction: (% wt) | 17.2 | 32.7 | 31.6 | 2.7 | 3.1 | 12.7 | 4.72 | 10.05 |
| Fine fraction: (% wt) | 1.0 | 5.0 | 14.2 | 5.0 | 9.2 | 65.6 | 3.03 | 7.24 |

The coarse fraction is placed in a Littleford Model DVT-30 heating and mixing vessel and dry mixed with about 15 gms. calcium oxide (lime) per 100 pounds of the coarse fraction. Water is then injected into the mixer to provide up to about 60 pounds of water per 100 pounds of the coarse fraction. Mixing is continued by operating the mixer at about 160 rpm to form a uniform mixture. The mixture is then heated by injecting steam at a steam pressure of about 15–20 psi directly into the mixer to obtain a temperature of about 96° C. at atmospheric pressure. The corn mixture is held at about 96° C. for about 15 minutes.

The steam is then discontinued and the fine fraction is added to the mixer with continuous mixing. A vacuum of about 21 to 31 inches of mercury is applied to the mixer and the corn mixture is dried under vacuum for about 20 minutes until the mixture reaches a temperature of about 52° C. to about 57° C. to dry the mixture to about 7% to 12% by weight moisture.

EXAMPLE 2

The process was carried out as in Example 1. The composition of the resulting masa flour is as shown in Table 2 below. The masa flour machines and processes easily using standard tortilla making equipment and produces a good tasting table tortilla.

TABLE 2

| Ingredients: | Percent By Weight: |
|---|---|
| Processed Ingredients: | |
| Whole White Corn | 63.39 |
| Whole Yellow Corn | 17.88 |
| Lecithin | 0.41 |
| Lime | 0.02 |
| Blended Ingredients: | |
| Whole White Concentrate | 12.50 |
| Light Toasted Germ | 5.00 |
| Fumeric Acid | 0.30 |
| Carboxymethylcellulose Gum (CMC) | 0.20 |
| Calcium Propionate | 0.20 |
| Potassium Sorbate | 0.10 |
| TOTAL: | 100.00 |

EXAMPLE 3

The process was carried out as in Example 1. The composition of the resulting product is shown in Table 3. The masa flour machined and processed well in standard tortilla making equipment and produced a good tasting product.

TABLE 3

| Ingredients: | Percent By Weight: |
|---|---|
| Processed Ingredients: | |
| Whole White Corn | 67.27 |
| Whole Yellow Corn | 18.97 |
| Lecithin | 0.43 |
| Lime | 0.03 |
| Blended Ingredients: | |
| Whole White Concentrate | 12.50 |
| Fumeric Acid | 0.30 |
| Carboxymethylcellulose Gum (CMC) | 0.20 |
| Calcium Propionate | 0.20 |
| Potassium Sorbate | 0.10 |
| TOTAL: | 100.00 |

EXAMPLE 4

Yellow corn was processed as in Example 1 to produce the masa flour product of Table 4. This masa flour processed well using standard tortilla making equipment.

TABLE 4

| Ingredients: | Percent By Weight: |
| --- | --- |
| Processed Ingredients: | |
| Whole Yellow Corn | 82.06 |
| Lecithin | 0.42 |
| Lime | 0.02 |
| Blended Ingredients: | |
| Whole Yellow Concentrate | 12.50 |
| Light Toasted Germ | 5.00 |
| TOTAL: | 100.00 |

While advantageous embodiments have been selected to illustrate the invention, it will be readily understood by those skilled in the art that various modifications and alternations can be made therein without departing from the spirit and scope of the invention as defined in the appended claims.

What is claimed is:

1. A process for producing a masa corn flour comprising the steps of combining ground whole corn, lime and water and forming an admixture having about 30% to about 65% by weight water based on the total weight of the admixture, heating the admixture to a temperature of about 71° C. to about 99° C. for a time sufficient to partially gelatinize the starch in the corn and to form a hot heat treated mixture, and applying a vacuum to the hot heat treated mixture to cool the mixture below the gelatinization temperature to inhibit further gelatinization and drying said mixture under said vacuum at a temperature below the gelatinization temperature to produce a dried masa corn flour having a moisture content of about 7% to about 13% by weight.

2. The process of claim 1, further comprising grinding whole kernel corn to an average particle size of at least about 0.6 mm prior to combining with the lime and water.

3. The process of claim 2, further comprising heating whole kernel corn to a temperature of at least 82° C. for sufficient time to deactivate enzymes in the corn prior to grinding, and heating the ground corn, lime and water admixture to a temperature of about 71° C. to about 82° C.

4. The process of claim 1, wherein the ground corn has a particle size of about 0.6 mm to about 0.180 mm.

5. The process of claim 1, further comprising heating the admixture by injecting steam at a pressure of about 15 to 30 psi.

6. The process of claim 1, wherein the heat treated mixture is dried under a vacuum of about 21 to about 31 inches of mercury.

7. The process of claim 1, wherein the admixture comprises up to about 1.3% by weight lime based on the weight of the ground corn.

8. The process of claim 7, wherein the admixture comprises up to about 0.2% by weight lime based on the weight of the ground corn.

9. The process of claim 1, further comprising discontinuing heating the admixture prior to applying the vacuum.

10. The process of claim 1, comprising drying the heat treated mixture to a moisture content of about 10% by weight based on the weight of the ground corn.

11. The process of claim 1, wherein the ground corn has an average particle size of about 0.6 mm, and the process further comprises the step of admixing a ground corn fraction having an average particle size of about 0.125 mm to said heat treated mixture after the heating step and before applying the vacuum.

12. The process of claim 1, further comprising the step of grinding the dried corn masa flour under conditions to maintain the temperature of the flour below the starch gelatinization temperature of the flour.

13. The process of claim 12, wherein the grinding step is carried out using an air classifier grinder or a cryogenic grinder.

14. A process for producing masa comprising the steps of heating whole corn kernels to a temperature of about 82° C. to about 93° C. for a time sufficient to deactivate enzymes in the corn, grinding the corn to produce ground corn, admixing the ground corn with an alkali and water to form an admixture, heating the admixture to a temperature of about 71° C. to about 82° C. for a time sufficient to produce a heat treated masa, and cooling the heat treated masa.

15. The process of claim 14, further comprising drying the heat treated masa under vacuum to produce a dried masa flour.

16. The process of claim 15, wherein the dried masa flour has a moisture content of about 7.0% to about 13.5% by weight water based on the total weight of the flour.

17. The process of claim 14, wherein the alkali is calcium oxide, calcium hydroxide or mixtures thereof.

18. The process of claim 15, wherein the alkali is lime, and the process comprises admixing the lime in the amount of up to about 0.2% by weight based on the weight of the corn.

19. The process of claim 14, wherein the admixture comprises about 30% to about 65% by weight water based on the total weight of the admixture.

20. The process of claim 14, comprising heating the admixture to gelatinize about 30% to 40% of the available starches in the corn.

21. The process of claim 14, further comprising heating the admixture by injecting steam at a pressure of about 15–30 psi.

22. The process of claim 15, comprising drying the mixture under a vacuum of about 21 to 31 inches of mercury.

23. The process of claim 15, further comprising the step of grinding the dried corn masa flour under conditions to maintain the temperatyre of the flour below the starch gelatinization temperature of the flour.

24. The process of claim 23, wherein the grinding step is carried out using an air classifier grinder or a cyrogenic grinder.

25. The process of claim 14, wherein said ground corn has a particle size of about 0.6 mm or less.

26. A process for producing a masa flour, comprising the steps of feeding a coarse ground corn having an average particle size of about 0.180 mm to about 0.60 mm to a mixing device, admixing the coarse ground corn with lime and water to form an admixture and heating the admixture to a temperature of about 93° C. to about 99° C. for about 15 minutes or less, to form a hot heat treated admixture, admixing a fine ground corn and a second amount of lime to the hot heat treated admixture, wherein the fine ground corn has an average particle size of about 0.125 mm to about 0.180 mm, and cooling and drying the admixture to produce the masa flour.

27. The process of claim 26, wherein the coarse corn fraction has an average particle size with a maximum of about, 15% by weight greater than 0.6 mm and no more than about 14% by weight less than about 0.180 mm.

28. The process of claim 26, further comprising the steps of prior to the feeding step, grinding whole kernel corn to produce ground corn, screening the ground corn through a screen and recovering an oversize fraction as the course ground corn which is fed to the mixing device for admixing and heating with the lime and water, and recovering an undersized fme ground corn fraction passed through the screen as the fine ground corn which is admixed with the heat treated admixture.

29. The process of claim 26, further comprising admixing the lime with the coarse corn fraction in the amount of up to about 0.2% by weight based on the weight of the corn.

30. The process of claim 26, further comprising the step of admixing the water with the coarse corn fraction in the amount of about 30% to about 65% by weight based on the total weight of the admixture.

31. The process of claim 26, further comprising heating the admixture to a temperature of about 96° C.

32. The process of claim 26, comprising applying heat to the admixture to heat the admixture, and discontinuing the application of heat before admixing the fine ground corn.

33. The process of claim 26, wherein the second amount of lime is admixed with the heat treated admixture in the amount of about 0.05% to about 0.3% by weight based on the combined weight of the coarse and fine ground corn.

34. The process of claim 26, comprising drying the admixture under vacuum.

35. The process of claim 34, wherein the admixture is dried under a vacuum of about 21 to 31 inches of mercury.

36. The process of claim 26, comprising drying the admixture to a moisture content of about 7% to about 12% by weight based on the weight of the corn.

* * * * *